Aug. 21, 1962 H. LINKS 3,050,001
FUEL SUPPLY SYSTEM
Filed Jan. 24, 1961 2 Sheets-Sheet 1

INVENTOR
Heinz Links
BY
Michael S. Striker
Attorney

Aug. 21, 1962 H. LINKS 3,050,001
FUEL SUPPLY SYSTEM
Filed Jan. 24, 1961 2 Sheets-Sheet 2
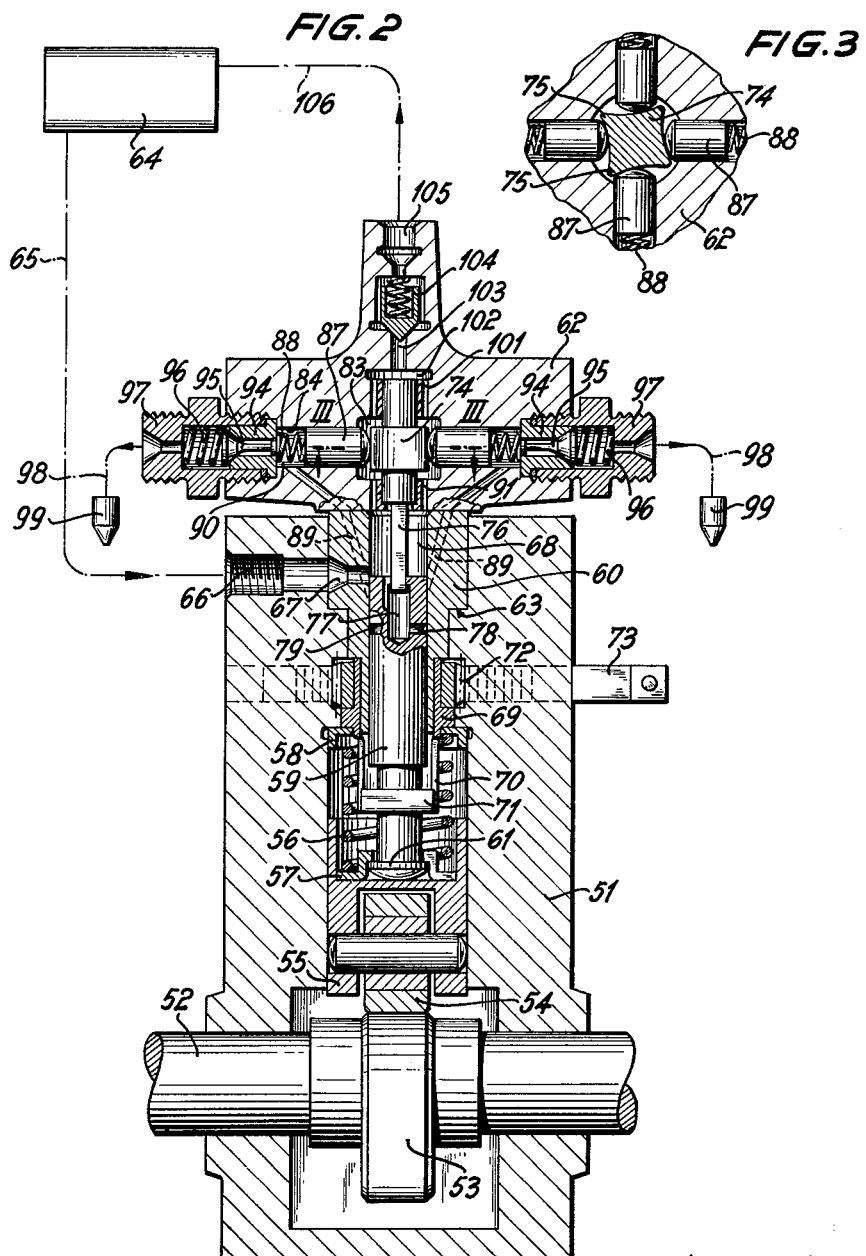
INVENTOR
Heinz Links
BY
Michael S. Striker
Attorney United States Patent Office 3,050,001
Patented Aug. 21, 1962

3,050,001
FUEL SUPPLY SYSTEM
Heinz Links, Stuttgart, Germany, assignor to Robert Bosch G.m.b.H., Stuttgart, Germany
Filed Jan. 24, 1961, Ser. No. 84,553
Claims priority, application Germany Jan. 29, 1960
9 Claims. (Cl. 103—2)

The present invention relates to fuel supply systems. More particularly, the present invention relates to fuel systems for internal combustion engines.

The fuel supply system of the present invention is that type of system according to which fuel is injected into the intake manifold adjacent to the cylinders of the internal combustion engine. Systems of this type generally include a plurality of metering pumps which pump metered amounts of fuel to the several cylinders, and these metering pumps are supplied with fuel by a main fuel pump. Conventional fuel supply systems of this type cannot operate with the desired number of cycles per unit of time because a certain minimum amount of time is required to supply the several metering pumps with fuel to be pumped thereby to the several cylinders, and because of the time required to deliver fuel to the several metering pumps it is not possible to operate these pumps with a relatively large number of cycles per unit of time. Moreover, it is desirable to be able to adjust the metering pumps so as to regulate the amount of fuel delivery thereby to the several cylinders, and at the present time the structure for making such an adjustment is extremely complex and is not very reliable in operation.

It is accordingly one of the main objects of the present invention to provide for a fuel supply system of the above type a construction which will enable the metering pumps to be supplied with fuel in a fraction of the amount of time previously required for this purpose so that with the structure of the invention it is possible to operate the pump at a number of cycles per unit of time far greater than has hitherto been possible.

It is also an object of the present invention to provide for a fuel supply system of the above type a single, simple element which can be very easily manipulated for the purpose of adjusting all of the metering pumps so as to regulate the amounts of fuel delivered thereby to the several cylinders.

It is also an object of the present invention to provide a structure which on the one hand is extremely compact and which on the other hand is quite simple and reliable in operation.

With the above objects in view, the invention includes, in a fuel supply system for supplying fuel to the cylinders of an internal combustion engine, a plurality of metering pumps each of which includes a metering cylinder and a metering piston slidable therein. Each metering cylinder has a discharge end through which fuel is supplied to a cylinder of the engine, and each metering piston has a working end directed toward the discharge end of the metering cylinder and defining with the latter a metering pump chamber whose volume decreases during the working or pressure stroke of the metering piston. All of the metering pistons have operating ends distant from their working ends, and a support means supports several metering pumps and defines a pressure chamber which communicates with all of the operating ends of the metering pistons. A main fuel pump has a main cylinder and a main piston slidable therein, and this main cylinder has a discharge end which communicates with the pressure chamber referred to above. The piston has a working end directed toward the discharge end of the main cylinder and defining with the latter a main pump chamber. A main supply conduit means communicates with this main pump chamber and terminates in an opening in the main cylinder which is adjacent to the working end of the main piston when the latter is as the end of its suction stroke. A plurality of metering supply conduit means respectively communicate with the plurality of metering pump chambers as well as with the main pump chamber, and this plurality of metering supply conduit means respectively terminate at the main cylinder in openings which are also located adjacent to the working end of the main piston when the latter is at the end of its suction stroke, so that when the main piston reaches the end of its suction stroke it opens all of the supply conduit means so that fuel will be delivered by the main supply conduit means to the main pump chamber and from the main pump chamber through the metering supply conduit means to the several metering pump chambers. During the initial part of the pressure stroke of the main piston this piston will close the openings of all of the supply conduit means which are located at the main cylinder adjacent to the main piston when the latter is at the end of its suction stroke.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawings, in which:

FIG. 2 is a sectional elevation of another embodiment of a fuel supply system according to the present invention, part of the structure of FIG. 2 also being shown diagrammatically; and FIG. 3 is a fragmentary sectional plan view taken along line III—III of FIG. 2 in the direction of the arrows and showing the construction of an adjustable stop means of the embodiment of FIG. 2.

Figure 1:
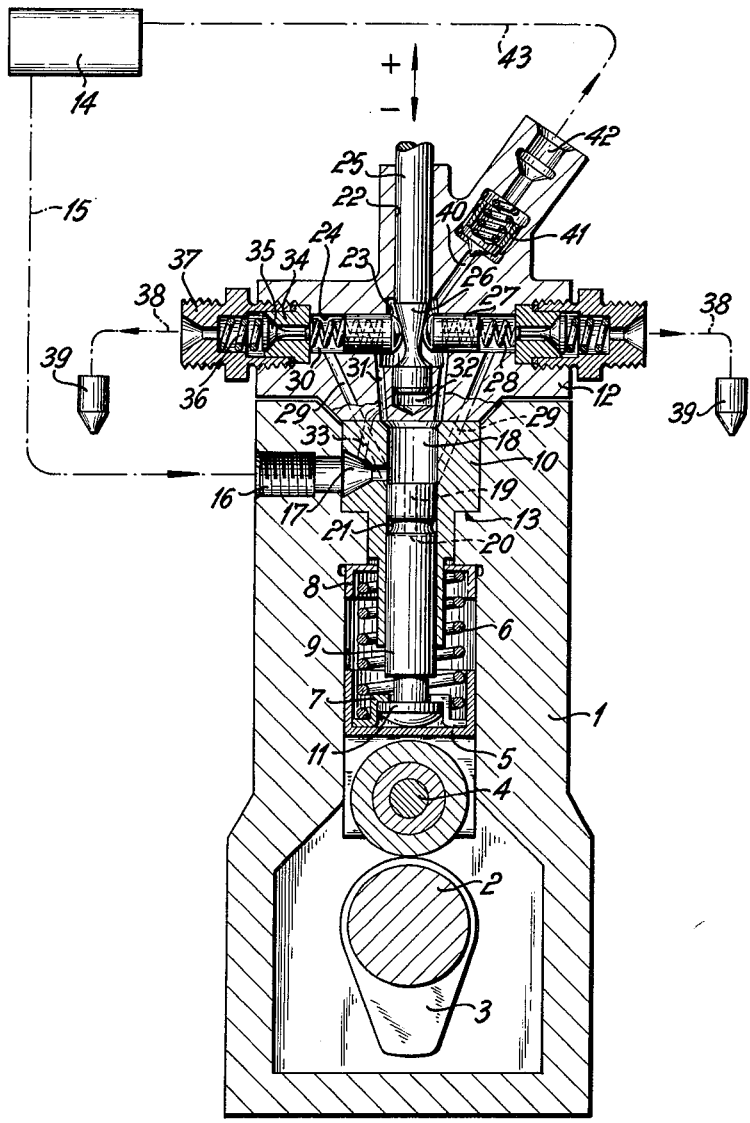
FIG. 1 is a sectional elevation showing one possible embodiment of a fuel supply system according to the present invention, part of the structure of FIG. 1 being shown diagrammatically.

Referring now to FIG. 1, there is shown therein the housing 1 of the main fuel pump of the fuel supply system of the invention. A cam shaft 2 is supported for rotary movement by the housing 1 and carries a cam 3 which cooperates with a cam follower roller 4 which is turnably carried by a plunger 5 which is axially slidable in a bore of the housing 1, as shown in FIG. 1. A coil spring 6 is located in the bore in which the plunger 5 is axially slidable, and this spring 6 presses with its bottom end as viewed in FIG. 1, against a washer 7 which is located in a recess of the plunger 5, so that the spring 6 acts through washer 7 on the plunger 5 to maintain the follower roller 4 in engagement with the cam 3. At its upper end the spring 6 bears against a washer 8 which rests against a surface of the housing 1 which is located at the end of the bore therein which receives the plunger 5.

The main fuel pump includes a main piston 9 which is axially slidable in a main cylinder 10 accommodated in a suitable opening formed in the housing 1, as indicated in FIG. 1, and extending into the recess or bore of the housing 1 which receives the plunger 5. At its lower end, as viewed in FIG. 1, the main piston 9 is provided with a head end 11 which is in the form of an enlarged annular portion and which is received in a raised portion of the washer 7 as indicated in FIG. 1, so that the piston 9 will reciprocate together with the plunger 5.

A support means 12 in the form of a suitable block of metal is fixed in an unillustrated manner to the housing 1 and presses the downwardly directed shoulder 13 of the main cylinder 10 against a mating upwardly directed shoulder of the housing 1.

The fuel is derived from a fuel tank 14 and flows from the latter along a conduit 15 through an inlet bore 16 formed in the housing 1 and through a radial bore 17 formed in the main cylinder 10 and communicating with the main pump chamber 18. The upper end of the main cylinder 10, as viewed in FIG. 1, is the discharge end of the main pump cylinder 10, and the upper end of the main piston 9, as viewed in FIG. 1, is the working end of the main piston 9, and the pump chamber 18 is defined between the discharge end of the main cylinder 10 and the working end of the main piston 9, the volume of this pump chamber 18 diminishing during the pressure stroke of the main piston 9. The portion of the housing 1 which is formed with the inlet bore 16 and the portion of the main cylinder 10 which is formed with the radial bore 17 cooperate together to form a main supply conduit means for directing the fuel from the tank 14 and the conduit 15 into the main pump chamber 18, and it will be noted that the main supply conduit means 16, 17 terminates at the main cylinder 10 in an opening which is located adjacent to the working end of the main piston 9 when the latter is at the end of its suction stroke, the piston 9 being shown at the end of its suction stroke in FIG. 1. Thus, when the main piston 9 reaches the end of its suction stroke it opens the main supply conduit means 16, 17 and during the initial part of the pressure stroke of the main piston 9 it will close the main supply conduit means 16, 17.

The main piston 9 is formed with an axial bore 19 extending downwardly from its working end and communicating with a transverse bore 20 whose ends communicate with an annular groove 21 formed in the exterior surface of the main piston 9.

The support means 12 is formed with an axial bore 22 whose axis coincides with the axis of the main piston 9 and the axial bore 22 is closed at its bottom end and has an intermediate portion 23 of a larger diameter than the remainder of the bore 22 and forming a pressure chamber which is defined by the support means 12.

The support means 12 carries a plurality of metering pumps which respectively meter the fuel to the several cylinders, and these metering pumps respectively have axes located in a common plane and extending radially from the pressure chamber 23. Each of the metering pumps includes a metering cylinder 24 in the form of a bore 24 formed in the support means 12, and the number of cylinders 24 corresponds to the number of cylinders of the internal combustion engine, and these cylinders 24 are uniformly distributed about the axis of the bore 22 and respectively have their axis located in a common plane and intersecting at the axis of the bore 22, this axis of the bore 22 being perpendicular to this common plane.

A stop means is provided for adjusting the several metering pumps, and this stop means in the embodiment of FIG. 1 includes the axially movable elongated rod member 25 which is slidable in the bore 22, and which has in the pressure chamber 23 a frustoconical portion 26 which forms a surface of revolution whose axis passes perpendicularly through the intersection of the axes of the several metering pumps. These metering pumps include in addition to the metering cylinders 24 the metering pistons 27 which are axially slidable in the metering cylinders 24, and the metering pistons 27 have operating ends of convexly curved configuration respectively forming parts of spheres and communicating with the pressure chamber 23. These operating ends of the metering pistons 27 engage the single stop means 26 which thus cooperates with the metering piston to determine the positions of the metering pistons when they are at the ends of their suction strokes. A plurality of springs 28 are respectively located in the metering cylinders 24 and engage the metering pistons 27 to urge the latter into engagement with the adjustable stop means 26.

An axially bored valve body 34 is located at the discharge end of each metering cylinder 24 and between the discharge end of each cylinder 24 and the working end of each piston 27, the working end of each piston 27 being directed toward the discharge end of the cylinder 24 and distant from the pressure chamber 23, is located the pump chamber 30 of each metering pump. A plurality of metering supply conduit means 29 respectively communicates with the several metering pump chambers 30 as well as with the main pump chamber 18 so that in this way the main pump chamber 18 is capable of communicating through the several metering supply conduit means 29 with the several metering pump chambers 30, respectively. Each conduit 29 is formed in part by a bore in the support means 12 and in part by a bore in the main cylinder 10, and the several metering supply conduit means 29 terminate in the main cylinder 10 in openings located at the main pump chamber 18 and located adjacent the working end of the main piston 9 when the latter is at the end of its suction stroke, as illustrated in FIG. 1. As is apparent from FIG. 1 the opening at the end of the main supply conduit means 16, 17 in the main cylinder 10 at the chamber 18 thereof is located at its uppermost part, as viewed in FIG. 1, at a greater distance from the working end of the main piston 9, when the latter is at the end of its suction stroke, then the upper portions of the openings at the lower ends of the plurality of metering supply conduit means 29, so that with this arrangement during the initial part of the pressure stroke of the main piston 9 the lower ends of the conduits 29 will not only be closed by the main piston 9, in addition these lower open ends of the conduits 29 will be closed before the opening at the right end of the main supply conduit means 16, 17 is closed by the piston 9 during the initial part of its pressure stroke. In this way, during the subsequent suction stroke of the main piston 9 it is the main supply conduit means 16, 17 which will be placed in communication with the chamber 18 in advance of the metering supply conduit means 29 just before the main piston 9 reaches the end of its suction stroke, and thus when the several metering supply conduit means 29 are placed in communication with the main pump chamber 18 at the end of the suction stroke of the piston 9 there will already be in the pump chamber 18 fuel received from the main supply conduit means 16, 17 to immediately flow through the several metering supply conduit means 29 into the several metering pump chambers 30 so that the latter are supplied with fuel in an absolute minimum amount of time.

The support means 12 is formed with a plurality of bores 31 communicating with the discharge end of the main pump chamber 18 and also communicating with the pressure chamber 23, so that in this way the pressure chamber 23 is maintained at all times in communication with the main pump chamber 18.

Below the rod 25 in the bore 22 adjacent the closed bottom end of the latter is a chamber 32 defined between the bottom end of the rod 25 and the bottom end of the bore 22, and a conduit means 33, shown in dotted lines in FIG. 1, provides communication between the chamber 32 and the main supply conduit means 16, 17, this conduit means 33 being formed by suitable bores in support means 12 and the main cylinder 10, as indicated in FIG. 1.

The several axially bored valve bodies 34 located at the discharge ends of the metering cylinders 24 support axially movable valve members 35, respectively, which are respectively urged by springs 36 to their closed positions where the valve members 34 engage valve seats formed at the outer ends of the valve bodies 34, as indicated in FIG. 1. The several springs 36 bear at their outer ends against annular surfaces of nipples 37 which on the one hand are threaded into bores of the support means 12 to maintain the valve bodies 34 in the positions illustrated in FIG. 1 and which on the other hand are capable of being threadedly connected with the several conduits 38 shown diagrammatically in FIG. 1 and communicating with the injection nozzles 39 in the intake manifold adjacent the several cylinders of the internal combustion engine, so that in this way the fuel which flows through the discharge ends of the metering cylinders 24 will be delivered through the valves 34, 35 to the injection nozzles 39.

The support means 12 is formed with a bore 40 forming a conduit means branching from the pressure chamber 23 and this conduit means 40 is provided with an overflow valve means 41 in the form of a spring-pressed non-return valve, as indicated in FIG. 1. There is sufficient clearance around the sidewalls of the axially movable valve member of the overflow valve means 41 to permit the fuel to flow freely past the valve means 41 when the latter moves to its open position as a result of an increase in pressure in the chamber 23 and of course in the conduit 40. The end 42 of the conduit 40 communicates through a conduit 43 with the fuel tank 14 so that the fuel which flows through the overflow valve means 41 will return to the fuel tank 14.

The parts are shown in FIG. 1 in the position they take at the end of the suction stroke of the main piston 9. At this time the main pump chamber 18 and the metering pump chambers 30 are all filled with fuel. During the subsequent pressure stroke of the main piston 9 the bottom open ends of the several metering supply conduit means 29 will be closed and immediately thereafter the open right end of the main supply conduit means 16, 17 will be closed. At the instant when the main supply conduit means 16, 17 is closed the piston 9 will deliver fuel through the bores 31 into the pressure chamber 23 and will cause the fuel to act through its increased pressure on the inner operating ends of the metering pistons 27 so as to radially move the several metering pistons 27 along their pressure strokes away from the stop means 26 so as to reduce the volumes of the metering pump chambers 30 and thus displace the fuel through the valves 34, 35 along the conduits 38 to the several injector nozzles 39. The pressure of the spring of the overflow valve means 41 is such that this overflow valve means 41 will automatically open when the several metering pistons 27 have moved along their pressure strokes to a predetermined degree and have reached the end of their pressure strokes at which time the overflow valve means 41 will automatically open, and now during the continued pressure stroke of the main piston 9 the fuel displaced by the latter into the pressure chamber 23 will flow through the overflow valve means 41 back to the tank 14. The pressure of the spring of the overflow valve means 41 is greater than the pressure required to move the several metering pistons 27 along their pressure strokes, and when the pressure in the chambers 23 is sufficient to open the overflow valve means 41 the pistons 27 will stop moving along their pressure strokes and since fuel is no longer displaced through the valves 34, 35 the springs 36 will now automatically close these valves.

As the main piston 9 approaches the ends of each of its pressure strokes the main supply conduit means 16, 17 is opened by the annular groove 21 of the main piston 9 and at this point the fuel will flow from the pump chamber 18 through the axial bore 19 and across bore 20 into the groove 21 and from the latter into the supply conduit means 16, 17 back to the tank 14. This return of fuel through the main supply conduit means 16, 17 continues until the end of the pressure stroke of the piston 9, and at this time the springs 28 start to expand and move the metering pistons 27 along their suction strokes toward the stop means 26. The metering pistons 27 have completed their suction strokes at the latest during the initial part of the suction stroke of the main piston 9 and thus the metering pistons 27 will be in the positions illustrated in FIG. 1 at the latest during the initial part of the suction stroke of the main piston 9. During this initial part of the suction stroke of the main piston 9 the fuel will flow from the main supply conduit means 16, 17 through the groove 21 and the bores 20 and 19 into the pump chamber 18 which is now increasing in volume, and this flow continues until the groove 21 moves downwardly, as viewed in FIG. 1, beyond the right open end of the conduit means 16, 17 so that the latter is now again closed. A vacuum will now be produced in the chamber 18 until the main supply conduit means 16, 17 is again opened during the last portion of the suction stroke of the main piston 9 when the working end thereof uncovers the opening of the main supply conduit means 16, 17 at the pump chamber 18, and, thus, at the end of the suction stroke of the piston 9 the fuel will flow freely into the pump chamber 18. Very shortly after the main conduit means 16,17 is opened at the end of the suction stroke of the main piston 9, this main piston 9 also opens the several metering supply conduit means 29 so that the fuel will also flow freely through the several metering supply conduit means 29 into several metering pump chambers 30 and all of these metering pump chambers 30 will be filled with fuel when the main piston 9 reaches the end of the suction stroke.

In order to be able to regulate the several metering pumps so as to control the amount of fuel supplied to the several cylinders of the internal combustion engine, it is only necessary to axially move the rod 25. When the rod 25 is moved upwardly, as viewed in FIG. 1, the frustoconical portion 26 of the rod 25, which forms the adjustable stop means, will move upwardly, as viewed in FIG. 1, so that the pistons 27 will be located closer to the axis of the rod 25 and thus in this way the amount of fuel delivered to each of the cylinders will be increased. In order to decrease the amount of fuel delivered into the several cylinders of the internal combustion engine it is only necessary to move the rod 25 downwardly. Any suitable means may be provided for manually shifting the rod 25 and for releasably maintaining it in an adjusted angular position.

In the embodiment of the invention which is shown in FIG. 2, there is a fuel pump housing 51 which corresponds to the housing 1 and which supports for rotation a cam shaft 52. In the particular example illustrated in FIG. 2 the fuel supply system is adapted to cooperate with an engine having four cylinders, but it is to be understood that the fuel pump system of the invention may be used with engines having any number of cylinders. The cam shaft 52 carries a cam 53 which cooperates with the cam follower roller 54 turnably carried by the plunger 55 which reciprocates in a bore formed in the housing 51, as shown in FIG. 2. A spring 56 bears with its bottom end on a washer 57 which is pressed by the spring against the plunger 55 and which is located together with the lower portion of the spring in a recess of the plunger 55, so that the spring 56 serves to maintain the cam follower roller 54 in engagement with the cam 53. At its upper end the spring 56 bears against a washer 58 which rests against a surface of the housing 51, as indicated in FIG. 2. A main pump piston 59, corresponding to the piston 9 of FIG. 1, reciprocates in a main cylinder 60 and at its lower end is provided with an enlarged portion 61 located in a raised part of the washer 57, as indicated in FIG. 2, so that in this way the main piston 59 will reciprocate together with the plunger 55. However, the connection of the piston 59 through its enlarged annular portion 61 to the washer 57 is such that the piston 59 can freely turn about its axis. A support means 62 in the form of a block of metal or the like is fixed in an unillustrated manner to the housing 51 and presses the cylinder 60 at its shoulder 63 against a mating shoulder of the housing 51.

From a fuel tank 64 the conduit 65 leads the fuel to the inlet bore 66 formed in the housing 51, this inlet bore communicating with a bore 67 formed in the cylinder 60, and these bores 66 and 67 form the main supply conduit means terminating in an opening at the inner surface of the cylinder 60 communicating with the main pump chamber 68 located between the upper working end of the piston 59 and the upper discharge end of the cylinder 60.

In the embodiment of FIG. 2 a sleeve 69 surrounds the lower portion of the cylinder 60 coaxially therewith and is freely turnable with respect thereto. The sleeve 69 while being turnable about its axis is restrained against axial movement in one direction by engagement between the top end of the sleeve 69, as viewed in FIG. 2, with a shoulder of the cylinder 60, and in the opposite direction by engagement with the washer 58, as indicated in FIG. 2. The lower portion of the sleeve 69, which extends downwardly from the cylinder 60 is provided with a pair of opposed axially extending cutouts extending perpendicularly from the bottom end of the sleeve 69, and in this way the bottom end of the sleeve 69 is bifurcated, and in these opposed cutouts are respectively received the ends of a cross pin 71 which extends through and is carried by the main piston 59. A pinion 72 surrounds and is fixed to the upper portion of the sleeve 69, and an elongated rack 73 is guided by the housing 51 or by any suitable bearings, brackets or the like carried thereby for movement to the right and left, as viewed in FIG. 2, rack 73 meshing with the pinion 72. The rack 73 is capable of being manually shifted by the operator through any suitable linkage or the like connected with the rack 73, and as a result of the shifting of the rack 73 the pinion 72 on the sleeve 69 therewith will turn so as to turn cross pin 71 and thus to turn the main piston 59 so as to determine the angular position thereof. Thus, the parts 69—73 form a manually operable means operatively connected with the main piston 59 for turning the latter to an angular position selected by the operator. As will be apparent from the description below the movement of the rack 73 enables the operator to adjust the amount of fuel delivered to each cylinder at each cycle of operation.

In the embodiment of FIG. 2 a stop means in the form of a single stop member 74 is provided to cooperate with all of the metering pistons 87 to determine the positions thereof at the end of their suction strokes. The single stop member 74 is in the form of a rotary cam means having a plurality of cams 75 of the configuration shown most clearly in FIG. 3, and all of these cams cooperate in exactly the same way with several metering pistons 87 to determine the positions of the latter at the ends of their suction strokes, as is apparent from FIG. 3. Inasmuch as the fuel supply system shown in FIGS. 2 and 3 is adapted to cooperate with an engine having four cylinders, there are four camming portions 75 on the rotary cam means 74 and four metering pumps having their metering pistons 87 cooperating with the cam 74 in the manner shown in FIG. 3. Below the cam 74, this single stop member 74 is fixed with a coaxial cylindrical member freely turnable in a recess formed in the support means 62, and fixed coaxially to the bottom end of this lower cylindrical portion beneath the cam 74 is an elongated motion transmitting element 76 which may be of rectangular or square cross section, or any non-circular cross section, and this member 76 extends at its upper end through the lower wall of the recess which receives the cylindrical portion below the cam 74, and this lower wall of the recess formed with an opening large enough to permit free turning of the member 76 about its axis which is common with the axis of the piston 59 and the cam 74. The main piston 59 is formed with an axial bore 77 extending downwardly from its working end, and next to the working end of the piston 59 the bore 77 has a configuration mating with that of the cross section of the motion transmitting members 76 so that while the piston 59 is free to shift axially with respect to the member 76, this member 76 is constrained to turn with the member 59 about the common axis of the piston 59 and the motion transmitting member 76. As is apparent from FIG. 2, the bore 77 has to one side of the motion transmitting member 76 a passage extending alongside of the motion transmitting member 76 and communicating with the lower, enlarged portion of the bore 77, so that irrespective of the angular position of the main piston 59 with respect to the motion transmitting member 76, the bore 77 will at all times remain in communication with the main pump chamber 68. It is apparent that the member 76 forms a motion transmitting means for transmitting the angular turning of the main piston 59 to the rotary cam 74 so that the angular position of the latter will be determined by the movement of the rack 73 and of course the angular position of the cam 74 determines the positions of the metering pistons 87 at the ends of their suction strokes, so that in this way the amount of fuel delivered to the several cylinders at each cycle can be regulated, as was described above in connection with FIG. 1. The cam 74 has fixed to its upper portion a cylindrical extension also turnable in a bore formed in the support means 62, and this latter bore communicates at its upper end with the space 102 as indicated in FIG. 2.

The lower end portion of the axial bore 77 on the main piston 59 communicates through a transverse bore 78 formed in the piston 59 with an annular groove 79 formed in the exterior surface of the piston 59, and in this way the annular groove 79 is in communication with the main pump chamber 68. The support means 62 is formed with a plurality of bores 91 which maintain the pump chamber 68 in constant communication with the pressure chamber 83 which is formed in that part of the support means 62 which receives the stop means 74 and which communicates with the operating ends of the metering pistons 87.

The metering pumps of the embodiment of FIG. 2 are substantially identical with that of FIG. 1 and include in addition to the metering pistons 87 the metering cylinders 84 in the form of bores formed in the block which forms the support means 62, and as is particularly apparent from FIG. 3 all of the metering cylinders 84 are located in a common plane and their axes intersect each other at a point through which the common axis of the main piston, rotary cam 74, and motion transmitting means 76 passes perpendicular to the common plane of the axes of the metering pumps. The ends of the metering pistons 87 which engage the cam 74 also form parts of spheres, as was the case with the metering pistons of FIG. 1. Springs 88 are located in the several metering cylinders 84 and urge the metering pistons 87 towards the cam 74 so as to yieldably maintain the metering pistons 87 at the ends of their suction strokes. Between the working end of each metering piston 87 and the discharge end of he metering cylinder 84 is located the metering pump chamber 90 of each metering pump, and all of the pump chambers 90 communicate through the metering supply conduit means 89 with the pump chamber 68. The several metering supply conduit means 89 are again in the form of bores formed in the support means 62 and the cylinder 60, and at their lower ends the several metering supply conduit means 89 terminate in openings at the pump chamber 68 located closely adjacent to the working end of the main piston 59 when this main piston is at the end of its suction stroke, the main piston 59 being shown in this position in FIG. 2. It will also be noted from FIG. 2 that, in the same way as in FIG. 1, the uppermost portion of the opening at the right end of the bore 67 of FIG. 2 is located at a greater distance from the working end of the piston 59, when this piston is at the end of the suction stroke, then the uppermost portion of the openings at the lower ends of the several metering supply conduits 89, so that with the embodiment of FIG. 2 during the initial part of the pressure stroke of the main piston 59 the several metering supply conduit means 89 will be closed before the main supply conduit means 66, 67 is closed, while on the other hand at the last portion of the suction stroke of the main piston 59 the fuel will have already flowed into the chamber 68 before the main piston 59 reaches the end of its suction stroke and opens the lower ends of the several metering supply conduit means 89, so that the instant that the lower ends of the several metering conduit means 89 are opened there is already in the pump chamber 68 fuel to flow immediately along the several metering supply conduit means 89 into the several metering pump chambers 90 to fill the latter and thus enable the structure of the invention to deliver fuel to the several metering pumps in an absolute minimum of time and in this way it is possible with the structure of the invention to operate the fuel supply system at an extremely large number of operating cycles for a given unit of time.

An axially bored valve member 94 is located at the discharge end of each metering cylinder 84 and an elongated valve member 95 cooperates with the valve body 94, a nipple 97 being screwed into the support means 62 for retaining each valve body 94 in the position shown in FIG. 2 and for connecting the several metering pumps to the several conduits 98 which respectively lead to the several injection nozzles 99 located at the several cylinders of the internal combustion engine. The nipples 97 also serve to house springs 96 which urge the valve members 95 against the valve seats formed at the outer ends of the valve bodies 94, so that the springs 96 yieldably maintain the valves 94, 95 in their closed positions shown in FIG. 2.

The support means 62 is formed with a plurality of bores 101 providing constant communication between the pressure chamber 83 and the space 102, and the support means 62 is formed with a bore 103 provided with an overflow valve means 104 which may be substantially identical with the over-flow valve means 41 described above, so that when the pressure in the pressure chamber 83 reaches a certain value the overflow valve means 104 will automatically open to permit fuel to flow through the passage 103 to the end 105 of this passage which is connected wtih a conduit 106 communicating with the tank 64, so that in this way the fuel which flows past the open overflow valve means 104 is returned to the fuel tank 64.

The parts of the embodiment of FIG. 2 are illustrated in FIG. 2 in the position they take at the end of the suction stroke of the main piston 59. The main pump chamber 68 as well as the metering pump chambers 90 are, therefore, all filled with fuel. During the subsequent pressure stroke of the main piston 59, this piston will first close the several metering supply conduit means 89 and will then close the main supply conduit means 66, 67. At the instant when the main supply conduit means 66, 67 is closed the main piston 59 pumps fuel from the chamber 68 through the discharge end of the cylinder 60 and the conduits or bores 91 into the pressure chamber 83 so as to increase the pressure in the chamber 83 and thus move the several metering pistons 87 along their pressure strokes away from the stop means 74. In this way fuel in the several metering pump chambers 90 automatically opens the valves 94, 95 and is delivered to the several injection nozzles 99 through the several conduits 98, respectively. As soon as the pressure in the chamber 83 has reached a given value the overflow valve means 104 automatically opens and the metering pistons 87 have thus reached the ends of their pressure strokes, respectively, and the springs 96 automatically move the valve members 95 to their positions in engagement with the valve seats of the valve bodies 94, so that valves 94, 95 automatically close at the ends of the pressure strokes of the pistons 87, and the delivery of fuel to the engines cylinders is terminated. With the opening of the overflow valve means 104 the fuel flows from the pressure chamber 83 through the bores 101 and the space 102 along the bore 103 into the conduit 106 and through the latter back to the tank 64. The spring of the overflow valve means 104 has a force which prevents the overflow valve 104 from opening until the several metering pistons 87 have moved through a predetermnied pressure stroke.

As soon as the annular groove 79 of the main piston 59 reaches the main supply conduit means 66, 67, the fuel in the chamber 68 flows through the bore 77 and the cross bore 68 into the groove 79 and from the latter into the main supply conduit means 66, 67, so that the valve 104 automatically closes at this time.

During the initial portion of the subsequent suction stroke of the main piston 59 the fuel will flow from the main supply conduit means 66, 67 into the groove 79, as long as the latter communicates with the main supply conduit means 66, 67, and from the groove 79 into the bore 78 and along the bore 77 into the pump chamber 68. During further movement of the main piston 59 along its suction stroke the main supply conduit means 66, 67 will be closed and therefore a vacuum will be produced in the pump chamber 68 until the working end of the piston 59 uncovers the main supply means 66, 67, and the fuel will at this instant flow freely into the pump chamber 68. The springs 88 have of course returned to the metering pistons 87 along their suction strokes to the positions indicated in FIGS. 2 and 3, and this movement ends at the latest during the initial part of the suction stroke of the piston 59, as was described above in connection with FIG. 1, so that as soon as the working end of the piston 59 opens the several metering supply conduit means 89 the fuel will flow freely from the chamber 68 into the several metering pump chambers 90 to fill the latter very quickly.

Inasmuch as it is possible by shifting the rack 73 to control the positions which the several metering pistons 87 take at the ends of their suction strokes, it is apparent that the length of the pressure strokes of the several metering pistons 87 can be controlled in this way and thus the amount of fuel delivered to the several engine cylinders at each cycle can be regulated by shifting the rack 73.

It will be understood that each of the elements described above or two or more together, may also find a useful application in other types of fuel supply systems differing from the types described above.

While the invention has been illustrated and described as embodied in fuel supply systems for injection nozzles, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various application without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. In a fuel supply system for internal combustion engines, in combination, a plurality of metering pumps for respectively metering the flow of fuel to the several cylinders of an internal combustion engine, each of said metering pumps including a metering cylinder and a metering piston slidable therein, each metering cylinder having a discharge end through which fuel discharges from said cylinder and each metering piston having a working end directed toward said discharge end of said cylinder and an opposed operating end, the space of each metering cylinder between said discharge end thereof and the working end of the piston therein forming a metering pump chamber whose volume is reduced during the pressure stroke of said metering piston; support means carrying said metering pumps and defining a pressure chamber communicating with all of said operating ends of said metering pistons; a fuel pump comprising a main cylinder and a main piston slidable therein along pressure and suction strokes, said main cylinder having a discharge end communicating with said pressure chamber and said main piston having a working end directed towards said discharge end of said main cylinder, said discharge end of said main cylinder and said working end of said main piston defining between themselves a main pump chamber whose volume is reduced during the pressure stroke and increased during the suction stroke of said main piston; main supply conduit means communicating with said main pump chamber and terminating in an opening in said main cylinder located adjacent said working end of said main piston when the latter is at the end of its suction stroke so that said supply conduit is opened by said main piston when the latter reaches the end of its suction stroke; a plurality of metering supply conduit means communicating with said metering pump chambers, respectively, and with said main pump chamber, said plurality of metering supply conduit means respectively terminating at said main cylinder in openings also located adjacent said working end of said main piston when the latter is at the end of its suction stroke so that said main piston opens said plurality of metering supply conduits when said main piston reaches the end of its suction stroke, all of said supply conduits being closed at their ends which communicate with said main pump chamber during the initial part of the pressure stroke of said main piston; a fuel tank communicating with said main supply conduit means to deliver fuel thereto; and overflow valve means communicating with said pressure chamber and with said fuel tank for automatically placing said pressure chamber and fuel tank in communication with each other when said metering pistons have reached the ends of their pressure strokes, respectively.

2. In a fuel supply system as recited in claim 1, a said opening of said main supply conduit means extending away from said main piston, when the latter reaches the end of its suction stroke, by a distance greater than said openings of said plurality of metering supply conduit means so that during the initial part of the pressure stroke of said main piston said openings of said metering supply conduit means will be closed before said opening of said main supply conduit means.

3. In a fuel supply system as recited in claim 2, adjustable stop means located in said pressure chamber and cooperating with said operating ends of said metering pistons for determining the positions thereof at the ends of their suction strokes, respectively, said metering pistons respectively having axes located in a common plane and said adjustable stop means including a single body which is engaged by said operating ends of said metering pistons at the ends of their suction strokes, respectively.

4. In a fuel supply system as recited in claim 3, said body being turnable about an axis normal to the plane in which said axes of said metering pistons are located and passing through the intersection of the latter axes, and said body having a plurality of camming portions which respectively cooperate with and engage said operating ends of said metering pistons.

5. In a fuel supply system as recited in claim 1, adjustable stop means located in said pressure chamber and cooperating with said operating ends of said metering pistons for determining the positions thereof at the ends of their suction strokes, respectively, said metering pistons respectively having axes located in a common plane and said adjustable stop means including a single body which is engaged by said operating ends of said metering pistons, respectively.

6. In a fuel supply system as recited in claim 5, said body of said adjustable stop means having an axis normal to the plane in which said axes of said metering pistons are located and passing through the intersection of said axes, and said body being adjustable along said axis thereof and being coaxial with said main piston.

7. In a fuel supply system as recited in claim 6, said adustable stop means including a pair of tubular guides for said body, one of said guides being located adjacent said main piston and having a closed end defining a chamber with an end of said body, said conduit means providing communication between said latter chamber and said main supply conduit means.

8. In a fuel supply system as recited in claim 1, adjustable stop means located in said pressure chamber and cooperating with said operating ends of said metering pistons for determining the positions thereof at the ends of their suction strokes, respectively, said metering pistons respectively having axes located in a common plane and said adjustable stop means including a single body engaged by said operating ends of said pistons, said body being turnable about an axis normal to said plane of said axes of said metering pistons and passing through the intersection of said axes, and said body having a plurality of camming portions respectively engaging and cooperating with said operating ends of said metering pistons.

9. In a fuel supply system as recited in claim 8, said main piston being turnable about its axis, and transmission means operatively connected to said main piston and said body of said adjustable stop means for transmitting only rotary movement of said mean piston to said body to adjust the angular position thereof.

References Cited in the file of this patent

UNITED STATES PATENTS

| | | |
|---|---|---|
| 1,864,860 | Salisbury | June 28, 1932 |
| 2,040,667 | Moulet | May 12, 1936 |
| 2,086,173 | Parker | July 6, 1937 |
| 2,281,045 | Outin | Apr. 28, 1942 |
| 2,397,136 | French | Mar. 26, 1946 |
| 2,624,284 | Straub | Jan. 6, 1953 |
| 2,947,257 | Bessiere | Aug. 2, 1960 |

FOREIGN PATENTS

| | | |
|---|---|---|
| 442,839 | Great Britain | Nov. 19, 1934 |
| 1,185,973 | France | Feb. 16, 1959 |